March 16, 1954 R. MITCHELL 2,672,069
SCREW AND WASHER ASSEMBLY
Filed May 21, 1952
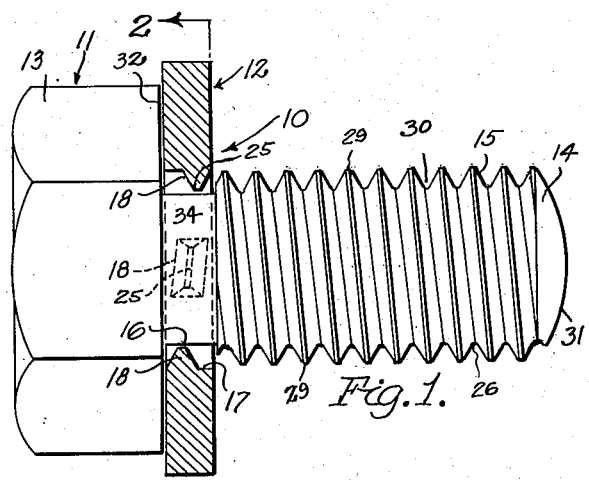
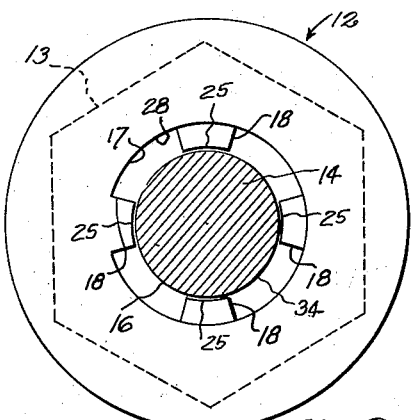
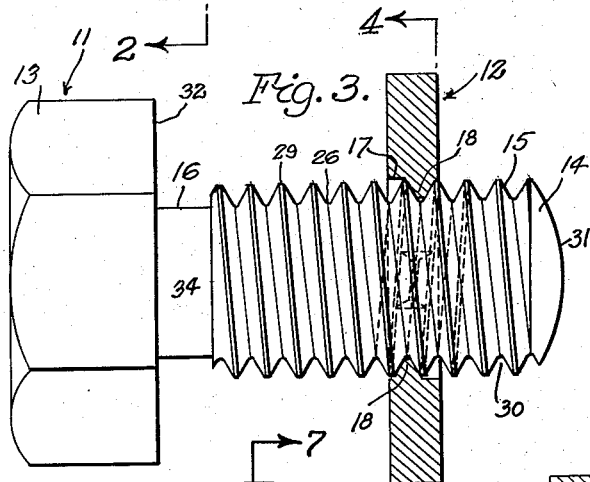
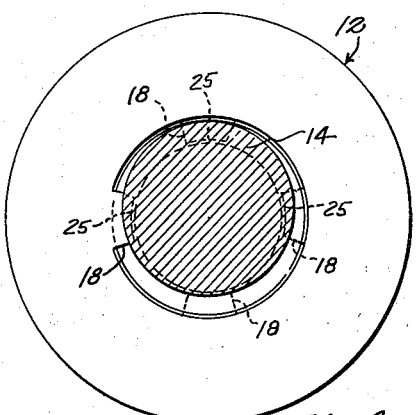
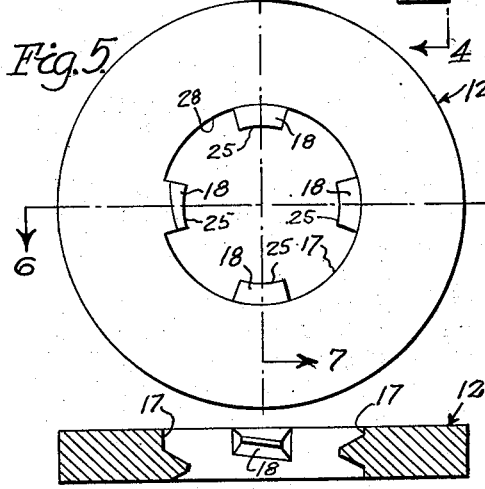
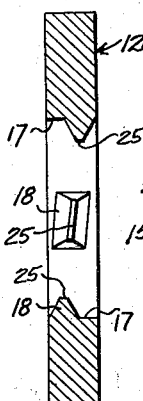
Inventor
Robert Mitchell
Barthel + Bugbee
Attorneys Patented Mar. 16, 1954

2,672,069

UNITED STATES PATENT OFFICE 2,672,069

SCREW AND WASHER ASSEMBLY

Robert Mitchell, Detroit, Mich.

Application May 21, 1952, Serial No. 289,105

3 Claims. (Cl. 85—1)

This invention relates to fasteners and, in particular, to screw and washer assemblies such as are used to give a greater covering surface over a clearance hole in fastening two or more pieces together, and the washer is free to rotate on the screw as it is being tightened.

One object of this invention is to provide a screw and washer assembly wherein the washer is held loosely and rotatably in engagement with the screw adjacent the head thereof, yet is prevented from slipping off the screw in such a manner that the assembly of the screw and washer can be shipped, stored or handled frequently and even roughly without loss of the washer, so that a workman upon an assembly line, for example, will always have complete assemblies available, without danger of separation of the individual components thereof.

Another object is to provide a screw and washer assembly wherein the washer is provided with spaced spirally-inclined internal teeth extending inwardly from the edge of its aperture and loosely fitting the threads of the screw to which it is to be applied, the screw having an annular groove in its shank adjacent its head so that when the washer occupies this groove it will spin freely but will not become dislodged from the screw during shipment or storage, the washer being thus a free member which is retained only for ease of handling.

Another object is to provide a screw and washer assembly of the foregoing character wherein either the screw or the washer may be replaced in the assembly with another screw or washer in case of damage to either of these components.

Another object is to provide a screw and washer assembly of the foregoing character wherein the teeth on the washer fit the screw thread sufficiently loosely to enable free spinning of the washer upon the screw, yet at the same time preventing removal of the washer from the screw either accidently or intentionally, without spinning the washer off the screw-threaded portion in the reverse direction.

Other objects and advantages of the invention will become apparent during the course of the following description of the accompanying drawing, wherein:

Figure 1 is a side elevation of a screw and washer assembly according to one form of the invention, with the washer in its final position adjacent the screw head and with the washer in section;

Figure 2 is a cross-section along the line 2—2 in Figure 1;

Figure 3 is a side elevation similar to Figure 1, wherein the washer has been threaded only partway onto the screw;

Figure 4 is a cross-section along the line 4—4 in Figure 3;

Figure 5 is a front elevation of the washer shown in Figures 1 to 4 inclusive;

Figure 6 is a horizontal section along the line 6—6 in Figure 5;

Figure 7 is a vertical section along the line 7—7 in Figure 5; and

Figure 8 is an enlarged fragmentary view of the upper central portion of Figure 3, showing the relationship between the washer teeth and the screw thread.

Screw and washer combinations or assemblies as used in securing parts to one another such as, for example, automobile parts upon an assembly line, have hitherto been difficult to keep together for the reason that the washer becomes separated from the screw. Prior washers have had central apertures large enough for the passage of the threaded portion of the screw, and usually with an added liberal clearance. The result has been that valuable time has been lost in providing screws with washers, due to the easy accidental separation of these components.

Prior attempts at installing a smooth apertured washer upon the shank of the screw before threading it and then rolling the thread afterward, have limited the extent to which the shank can be threaded and consequently have prevented the complete insertion of the screw into the threaded hole, so that the washer comes into tightly fitting contact with the surface surrounding the screw hole. Moreover, such washers tend to jam against the threaded portion of the screw. This type of screw and washer assembly is therefore usable only when a member with an unthreaded hole, such as a piece of perforated metal, intervenes between the washer and the screw hole to act as a spacer or collar. Furthermore, if the screws so made are to be hardened, the washer, being inseparable from the screw, also becomes hardened and therefore undesirably brittle, whereas a soft washer is desirable for proper fitting and holding qualities.

The screw and washer assembly of the present invention provides a screw which is threaded before the washer is installed, and which has an annular groove adjacent its head which is smaller than the root diameter of the screw thread. The washer is provided with a plurality of teeth extending inwardly from the edge of its aperture and having a profile similar to the thread groove profile, with the lands or crests of the washer teeth disposed in a spiral path corresponding to the spiral path of the thread root groove and crest. The screw, after threading, may, if desired, be hardened without adversely affecting the washer because the latter may be applied to the screw after threading. A liberal clearance is provided between the washer teeth and the thread groove so that the teeth fit sufficiently loosely that the washer can be threaded onto the screw by an easy spinning motion, coming to rest in the annular groove adjacent the screw head. In this manner, the shank of the screw can be threaded into a threaded hole completely up to the washer without the need for an intervening unthreaded hole such as a hole in a piece of sheet material, as the annular groove can be made approximately the same width as the thickness of the washer.

Referring to the drawings in detail, Figure 1 shows a screw and washer assembly, generally designated 10, according to one form of the invention as including a cap screw 11 carrying a washer 12. Any form of screw may be employed in connection with the invention, the cap screw 11 being shown merely for purposes of illustration and not by way of limitation. As shown, the screw 11 is provided with a head 13 of any desired shape, either with or without the usual slot or screw driver recess. The shank 14 of the screw 11 is provided with a helical threaded portion 15 which terminates in an annular groove 16, the diameter of which does not exceed the root diameter of the threaded portion 15 and is preferably of slightly smaller dimensions. The annular groove 16 preferably has a width of approximately the same thickness as the washer 12. The threaded portion 15 may be formed on the shank 14 either by rolling or cutting, and may be hardened in any suitable and conventional manner, if so desired, before the washer 12 is installed.

The washer 12 is in the form of an annular disc having a central aperture 17 which preferably has approximately the same or slightly greater diameter than the threaded portion 15 of the screw shank 14, sufficient clearance of course being provided therebetween to facilitate the application of the washer 12 to the threaded portion 15. The washers 12 are preferably made of soft steel, brass, aluminum, copper or the like in order to prevent damage to the parts against which they are placed. The washer 12 may have as few as three teeth for small screws and four or more teeth for large screws.

Extending radially inward from the edge of the aperture 17 in the washer 12 are three or more internal projections or teeth 18 having profiles corresponding to the thread groove profile (Figure 8), opposite sides 19 and 20 being separated from the thread groove sides 21 and 22 respectively by clearance spaces 23 and 24 respectively. The crests 25 or flats on the inner ends of the teeth 18 are spaced away from the thread roots 26 so as to provide a still further clearance 27 therebetween.

The crests 25 of the teeth 18 are arcuate in a circumferential direction (Figure 2) and are preferably less than the circumferential widths of the arcuate intervals 28 between adjacent teeth 18 so as to minimize the friction between the teeth 18 and the threaded portion 15 of the screw 11. The crests 25 of the teeth 18 lie upon a helical path corresponding to the helical path of the screw thread root 26 (Figures 6 and 7) so as to smoothly and easily engage the threads and enable the spinning of the washer 12 onto the threaded portion 15 of the screw 11. The thread groove sides or flanks 21 and 22 approach one another and are separated from one another by the crests 29 which are flattened portions arranged in a helical path according to the pitch of the screw.

The dimensions and angles of inclination of the various portions of the thread 15 and teeth 18 are preferably those which have been adopted as standards, such as, for example, the so-called Unified American Thread Profile. In such a standardized screw thread system, for example, the screw thread crest 29 has a width of one-eighth of the pitch, the screw thread root 26 has a width of one quarter of the pitch with a radius thereon, and the washer tooth crest 25 has a width of one quarter of the pitch, but without the radius possessed by the screw thread root 26.

Since the washer teeth 18 are provided with profiles corresponding to and loosely mating with the thread groove, they have a much greater overlap on the walls of the thread groove than blunt-ended teeth would possess. As previously stated, the washer teeth 18 and the threaded portion 15 of the screw 11 have truncated crests 25 and 29 respectively rather than sharp crests.

The washers 12 are mounted upon the threaded portions 15 of the screws 11 merely by starting the washer teeth 18 in the thread groove 30 at the end 31 of the screw and then threaded thereon by a spinning motion applied by the operator's fingers. The washer 12 spins freely upon the threaded portion 15, due to the ample clearances provided and due to the truncated threaded portions 15 and teeth 18. The washer 12, after this spinning operation, moves off the threaded portion 15 and enters the annular groove 16 adjacent the head 13, and is halted by engagement with the inner surface 32 of the screw head 13. Since the annular groove 16 has a smooth surface 34, the washer 12 is free to rotate thereon without interference. In order to provide the washer 12 with a slight amount of self-alignment, the annular groove 16 may be made slightly wider than the thickness of the washer 12. This limited self-alignment is useful when the screw 11 is threaded into a screw hole which is not accurately perpendicular to the workpiece surface. The spinning of the washers 12 onto the screws 11 may be done by hand or by automatic machinery, according to the circumstances.

In the use of the screw and washer assembly 10 of the invention, these assemblies may be shipped and stored in barrels, boxes or other suitable containers without any danger of the washer 12 separating itself from the screw 11. Such pre-assembled screw and washer units 10 are supplied to the workman without the need for their assembling these parts, thus saving much time and preventing interruptions in their work. Such interruptions become serious when the assembly operations are carefully timed, as in an automobile or airplane assembly line. Any screws 11 or washers 12 which may become damaged during shipment, storage or use may be easily removed from their associated washers or screws by merely reversing the spinning operation previously described as, unlike certain prior assemblies, the toothed washer 12 may be removed from the screw 11.

What I claim is:

1. A screw and washer assembly comprising a screw having a head and a threaded shank with an annular groove therein adjacent said head, the bottom of said groove having a diameter not greater than the root diameter of said threaded shank, and a substantially flat parallel-faced annular washer disposed in said groove, said washer having a continuous unbroken rim and a central aperture with at least three circumferentially-spaced teeth projecting inwardly therefrom into said groove, all of said teeth being confined to the space between the planes of the washer faces and having their inner ends disposed upon the thread helix of said threaded shank and confined within substantially a single turn of the thread of said threaded shank, said teeth being of wedge-shaped profile corresponding substantially to the thread groove profile of said threaded shank and loosely fitting the same, the circumferential widths of said teeth being relatively small in proportion to the circumferential widths of the spaces between said teeth.

2. A screw and washer assembly comprising a screw having a head and a threaded shank with an annular groove therein adjacent said head, the bottom of said groove having a diameter not greater than the root diameter of said threaded shank, and a substantially flat parallel-faced annular washer disposed in said groove, said washer having a continuous unbroken rim and a central aperture with at least three circumferentially-spaced teeth projecting inward therefrom into said groove, all of said teeth being confined to the space between the planes of the washer faces and having their inner ends disposed upon the thread helix of said threaded shank and confined within substantially a single turn of the thread of said threaded shank, said teeth being of wedge-shaped profile corresponding substantially to the thread groove profile of said threaded shank and loosely fitting the same, the circumferential widths of said teeth being relatively small in proportion to the circumferential widths of the spaces between said teeth, said inner ends of said teeth being of arcuate shape.

3. A screw and washer assembly comprising a screw having a head and a threaded shank with an annular groove therein adjacent said head, the bottom of said groove having a diameter not greater than the root diameter of said threaded shank, and a substantially flat parallel-faced annular washer disposed in said groove, said washer having a continuous unbroken rim and a central aperture with at least three circumferentially-spaced teeth projecting inward therefrom into said groove, all of said teeth being confined to the space between the planes of the washer faces and having their inner ends disposed upon the thread helix of said threaded shank and confined within substantially a single turn of the thread of said threaded shank, said teeth being of wedge-shaped profile corresponding substantially to the thread groove profile of said threaded shank and loosely fitting the same, the circumferential widths of said teeth being relatively small in proportion to the circumferential widths of the spaces between said teeth, said teeth tapering inwardly toward the center of said aperture in approximately radial directions.

ROBERT MITCHELL.

References Cited in the file of this patent
UNITED STATES PATENTS

| Number | Name | Date |
| --- | --- | --- |
| 1,028,859 | Bullard | June 11, 1912 |
| 1,547,162 | Bohlman | July 28, 1925 |
| 2,270,359 | Tomalis | Jan. 20, 1942 |
| 2,284,081 | Beggs | May 26, 1942 |
| 2,460,613 | Whelan | Feb. 1, 1949 |
| 2,577,319 | Feitl | Dec. 4, 1951 |